United States Patent [19]

Little

[11] 4,067,213

[45] Jan. 10, 1978

[54] TRUCK TRAILER FIFTH WHEEL PIN LOCK

[75] Inventor: Oney M. Little, Muncy, Pa.

[73] Assignee: The Raymond Lee Organization, Inc., New York, N.Y. ; a part interest

[21] Appl. No.: 708,004

[22] Filed: July 23, 1976

[51] Int. Cl.² ............................................. F16B 41/00
[52] U.S. Cl. .......................................... 70/232; 292/49
[58] Field of Search ................. 70/229, 230, 231, 232, 70/168; 292/49, 46, 47

[56] References Cited

U.S. PATENT DOCUMENTS

| 2,706,392 | 4/1955 | Lucas | 70/232 |
| 3,744,284 | 7/1973 | Waldenstrom | 70/232 |
| 3,757,550 | 9/1973 | Kayser | 70/232 |

Primary Examiner—Robert L. Wolfe
Attorney, Agent, or Firm—Daniel Jay Tick

[57] ABSTRACT

A bowl-like housing has an open mouth. A locking device selectively locks the housing coaxially around the fifth wheel pin of a truck trailer thereby obstructing such pin and preventing coupling thereof to a tractor.

2 Claims, 9 Drawing Figures

TRUCK TRAILER FIFTH WHEEL PIN LOCK

BACKGROUND OF THE INVENTION

The present invention relates to a truck trailer fifth wheel pin lock. More particularly, the invention relates to a truck trailer fifth wheel pin lock for protecting a truck trailer from theft by obstructing the fifth wheel pin of the trailer to prevent coupling thereof to a tractor.

Objects of the invention are to provide a truck trailer fifth wheel pin lock of simple structure, which is inexpensive in manufacture, used with facility and convenience, and functions efficiently, effectively and reliably to protect a truck trailer from theft by obstructing the fifth wheel pin of the trailer to prevent coupling thereof to a tractor.

BRIEF DESCRIPTION OF THE DRAWINGS

In order that the invention may be readily carried into effect, it will now be described with reference to the accompanying drawings, wherein.

Figure 1:
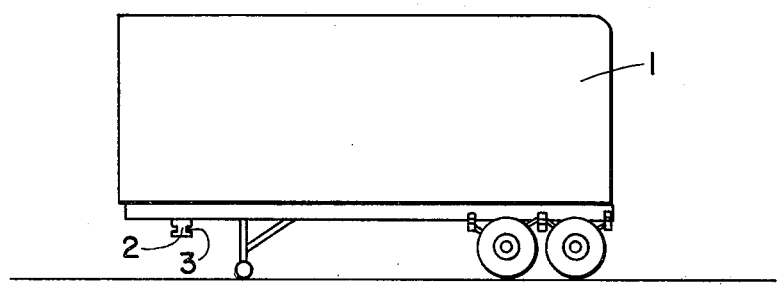
FIG. 1 is a view of a truck trailer having a fifth wheel pin.
Figure 5:
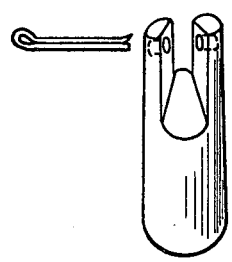
FIG. 5 is a perspective view, on an enlarged scale, of a fastening member of the embodiment of FIG. 2.

DETAILED DESCRIPTION OF THE INVENTION:

The truck trailer fifth wheel pin lock of the invention protects a truck trailer 1 (FIGS. 1 and 7) from theft by obstructing the fifth wheel pin 2 (FIG. 1) of the trailer to prevent coupling thereof to a tractor. The fifth wheel pin 2 has a circumferential circular groove 3 extending therearound, as shown in FIG. 1.

The truck trailer pin lock of the invention comprises a bowl-like housing 4 having an open mouth 5 (FIG. 2) and a closed end 6 (FIGS. 2 and 7 to 9).

In accordance with the invention, a locking device selectively locks the housing 4 substantially coaxially around the fifth wheel pin 2 of the truck trailer 1 thereby obstructing said fifth wheel pin and preventing coupling thereof to a tractor.

Figure 6:
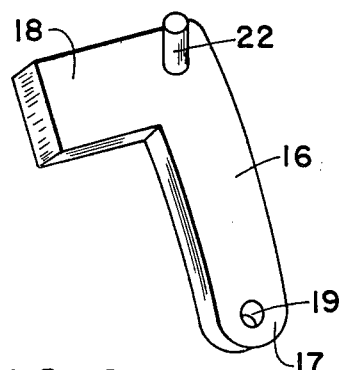
FIG. 6 is a perspective view, on an enlarged scale, of an embodiment of a locking member of the embodiment of FIG. 2.

The locking device cmprises an annular guide member 7 (FIGS. 2 to 4 and 7 to 9) coaxially rotatably mounted on the housing 4 at the open mouth 5 thereof and having a plurality of slots 8 and 9, 10 and 11, and 12 and 13 (FIGS. 2 to 4) formed therethrough. Three locking members 14, 15 and 16 (FIGS. 3 to 4) are provided. As shown in FIG. 6, wherein one of the locking members 16 is shown on an enlarged scale, each of the locking members has spaced opposite first and second ends 17 and 18.

Figure 2:
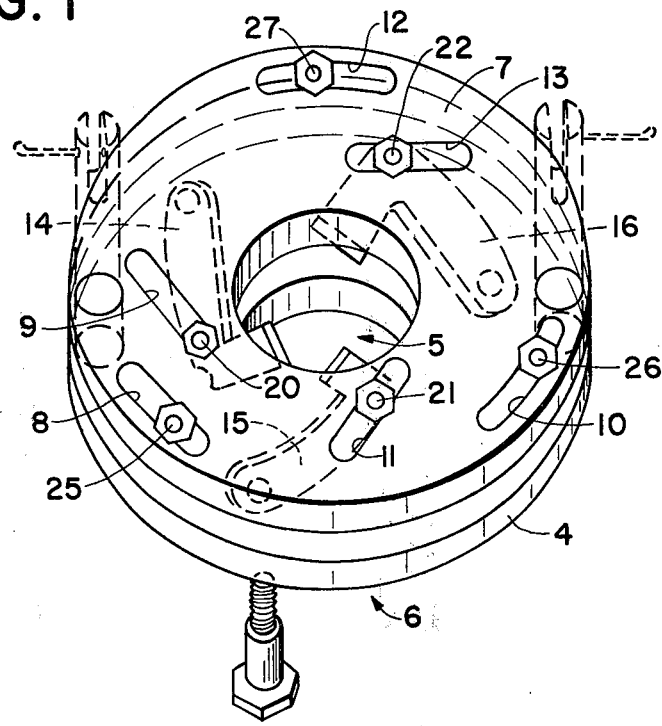
FIG. 2 is a perspective view, from the open mouth thereof, of an embodiment of the truck trailer fifth wheel pin lock of the invention.
Figure 3:
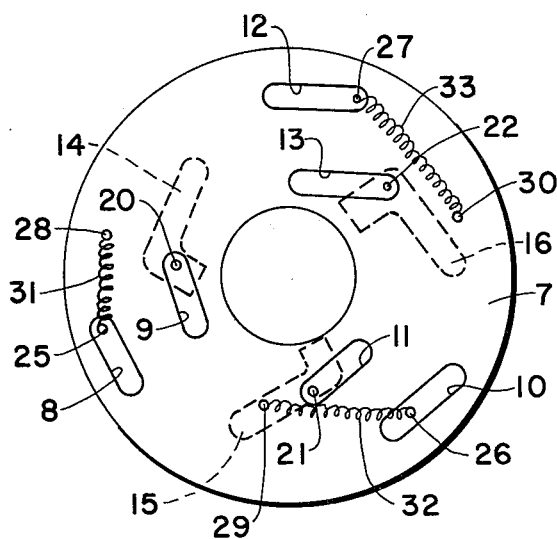
FIG. 3 is an axial view of the embodiment of FIG. 2 from the open mouth thereof, with the locking members out of locking engagement.
Figure 4:
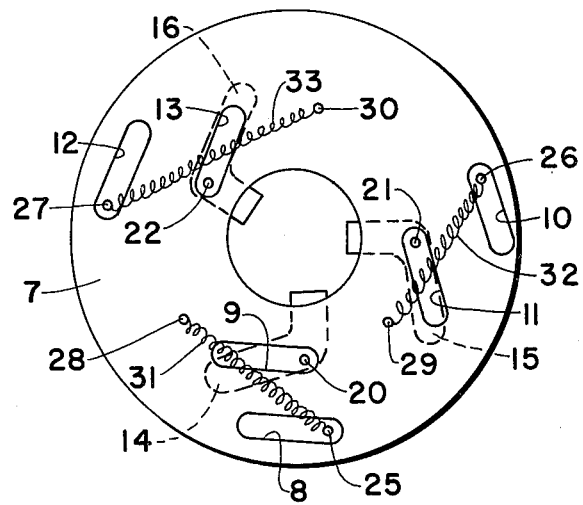
FIG. 4 is an axial view, from the open mouth thereof, of the embodiment of FIG. 2, with the locking members in locking engagement.

The locking members 14, 15 and 16 are pivotally mounted in the housing 4 at the mouth 5 thereof in equiangularly spaced relation, as shown in FIGS. 2 to 4, in the area of the first end 17 of each via a pivot hole 19 formed therethrough, as shown in FIG. 6. Each of the locking members is of substantially L-shape and is pivotally mounted in the housing 4 at the extreme end of one of the arms thereof, as shown in FIG. 6. The arm, at which the locking member is pivotally mounted, is approximately twice the length of the other arm extending at right angles thereto.

Each of the locking members 14, 15 and 16 has a pin 20, 21 and 22, respectively (FIGS. 2 to 4 and 6), extending therefrom at the juncture of the arms thereof, as shown in FIG. 6. The pins 20, 21 and 22 extend through the slots 9, 11 and 13, respectively, as shown in FIGS. 2 to 4, for guiding the second end 18 of each of the locking members 14, 15 and 16 into locking engagement in the groove 3 of the fifth wheel pin 2 in one position of the guide member 7, shown in FIGS. 2 and 4. The pins 20, 21 and 22 also guide the second end 18 of the locking members 14, 15 and 16 out of locking engagement with the groove 3 of the fifth wheel pin 2 and free therefrom in another position of the guide member 7 (FIG. 3).

Figure 7:
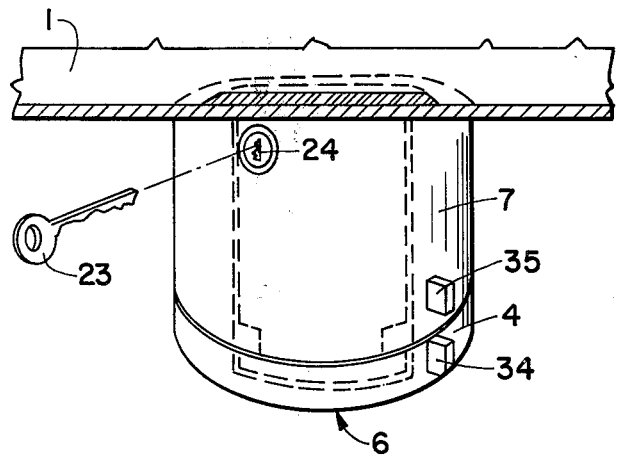
FIG. 7 is a perspective view of the embodiment of FIG. 2 and a cross-sectional view of part of the trailer of FIG. 1, illustrating the mounting of the fifth wheel pin lock of the invention.

A spring device coupled to the housing 4 and the guide member 7 urges the locking members 14, 15 ad 16 into locking engagement when the guide member is rotated in a predetermined direction about its axis. This direction is couterclockwise in FIG. 3. A key-released latch device secures the locking members 14, 15 and 16 in position in locking engagement and permits the release thereof upon operation of a key 23 (FIG. 7). This may be accomplished by any suitable device such as, for example, a semi-circular ring which moves upward by spring action when the locking members 14, 15 and 16 are moved into locking position. When the key 23 is inserted into a keyhole 24, it contacts a lever which abuts the semicircular ring and moves it downward to release the spring-bias and thereby release the locking members.

The spring device comprises a first plurality of three spring pins 25, 26 and 27 extending from the housing in directions substantially parallel to the axis and equiangularly disposed. The spring pins 25, 26 and 27 extend through the slots 8, 10 and 12, respectively, of the guide member 7 (FIGS. 2 to 4). A second plurality of three spring pins 28, 29 and 30 extend from the guide member 7 in spaced relation with the slots 8, 10 and 12 in directions substantially parallel to the axis and are equiangularly disposed, as in FIGS. 3 and 4. A plurality of three springs 31, 32 and 33 has spaced opposite first and second ends. The spring 31 is affixed at its first end to the spring pin 25 and is affixed at its second end to the spring pin 28. The spring 32 is affixed at its first end to the spring pin 26 and is affixed at its second end to the spring pin 29. The spring 33 is affixed at its first end to the spring pin 27 and at its second end to the spring pin 30.

Figure 8:
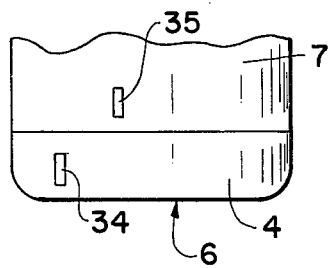
FIG. 8 is a side view of the embodiment of FIG. 7, out of locking engagement.
Figure 9:
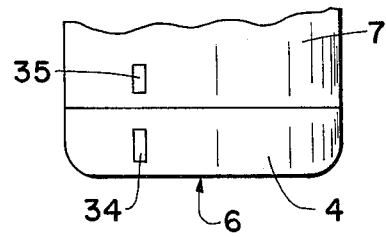
FIG. 9 is a side view of the embodiment of FIG. 7, in locking engagement.

When the housing 4 is rotated in clockwise direction, whereby a pair of manual projections 34 and 35 extending from said housing and from the guide member 7, respectively, are moved apart, as shown in FIG. 8, the guide member functions to move the locking members 14, 15 and 16 into their positions in which they are out of locking engagement. The manual projections 34 and 35 extend from the outer surfaces of the housing 4 and the guide member 7, respectively. When the housing 4 is manually rotated by grasping the projections 34 and 35 and rotating said housing in a counterclockwise direction so that said projections are aligned, as shown in FIGS. 7 and 9, the guide member moves the locking members 14, 15 and 16 into locking engagement.

While the invention has been described by means of a specific example and in a specific embodiment, I do not wish to be limited thereto, for obvious modificaions will occur to those skilled in the art without departing from the spirit and scope of the invention.

I claim:

1. A truck trailer fifth wheel pin lock for protecting a truck trailer from theft by obstructing the fifth wheel pin of the trailer to prevent coupling thereof to a tractor, said fifth wheel pin having a circumferential circular groove extending therearound, said truck trailer fifth wheel pin lock comprising a bowl-like housing, said housing having an open mouth; and locking means for selectively locking the housing substantially coaxially around the fifth wheel pin of a truck trailer thereby obstructing said fifth wheel pin and preventing coupling thereof to a tractor, said locking means comprising an annular guide member coaxially rotatably mounted on the housing at the open mouth thereof and having a plurality of slots formed therethrough, a plurality of locking members, each having spaced opposite first and second ends, pivotally mounted in the housing at the mouth thereof in equiangularly spaced relation in the area of the first end of each, each of said locking members having a pin extending therefrom through a corresponding one of the slots for guiding the second end of the locking member into locking engagement in the groove of the fifth wheel pin in one position of said guide member and for guiding the second end of the locking member out of locking engagement with the groove of the fifth wheel pin and free therefrom in another position of said guide member, spring means coupled to the housing and the guide member for urging the locking members into locking engagement when the guide member is rotated in a predetermined direction about its axis, and key-released latch means for securing said locking members in position in locking engagement.

2. A truck trailer fifth wheel lock as claimed in claim 1, wherein the spring means of the locking means comprises a first plurality of spring pins of the same number as the locking members extending from the housing at the mouth thereof in directions substantially parallel to the axis and equiangularly disposed, each of said first plurality of spring pins extending through a corresponding one of the slots of the guide member different from those accommodating the pins of the locking members, a second plurality of spring pins of the same number as the first plurality extending from the guide member in spaced relation with the slots accommodating the first spring pins in directions substantially parallel to the axis and equiangularly disposed, and a plurality of springs of the same number as the locking members, each of the springs having spaced opposite first and second ends, each of the springs being affixed at its first end to a corresponding one of the first plurality of spring pins and being affixed at its second end to a corresponding one of the second plurality of spring pins.

* * * * *